Feb. 17, 1959 R. C. WOOFTER 2,874,365
CONNECTOR
Filed Sept. 20, 1954 4 Sheets-Sheet 1
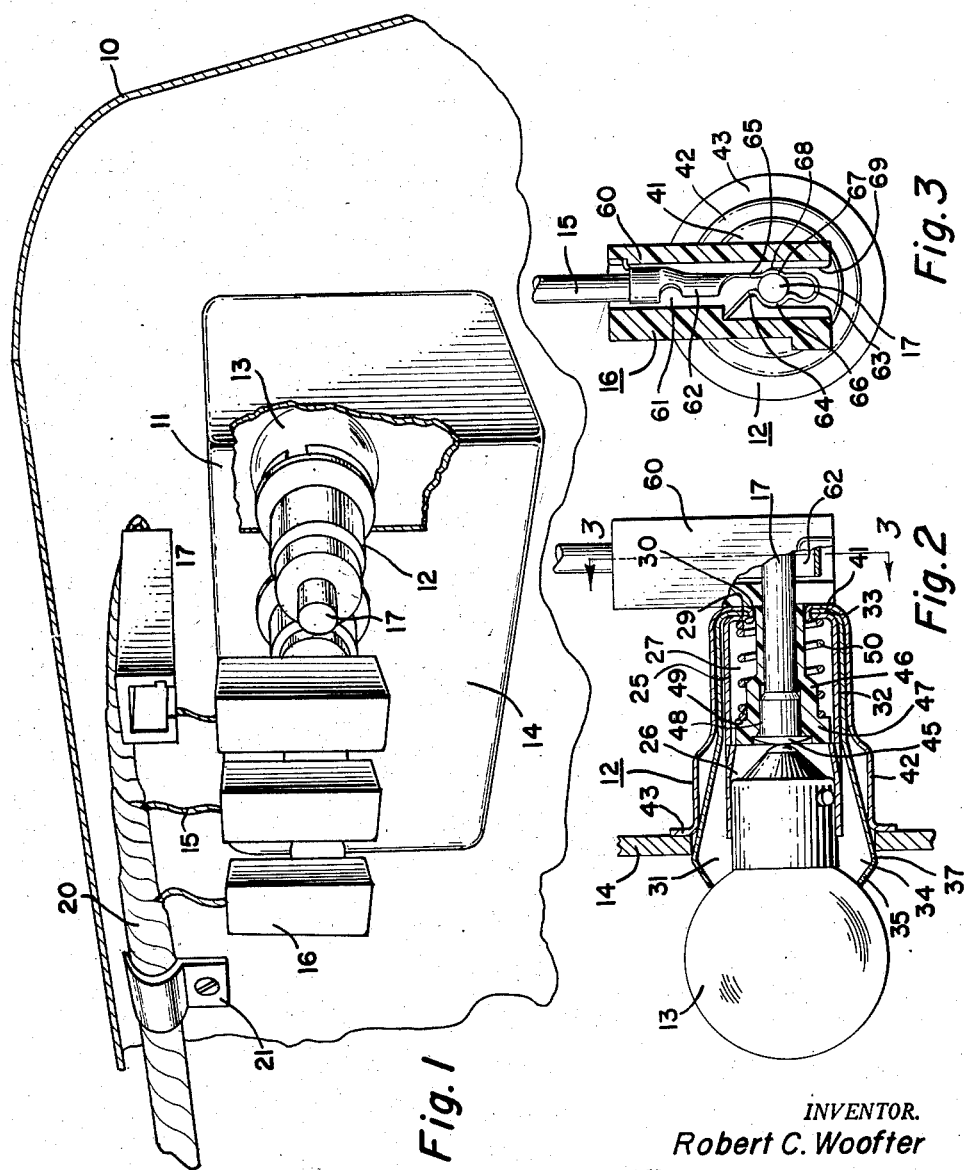
INVENTOR.
Robert C. Woofter
BY
Craig V. Morton
His Attorney Feb. 17, 1959 R. C. WOOFTER 2,874,365
CONNECTOR
Filed Sept. 20, 1954 4 Sheets-Sheet 2
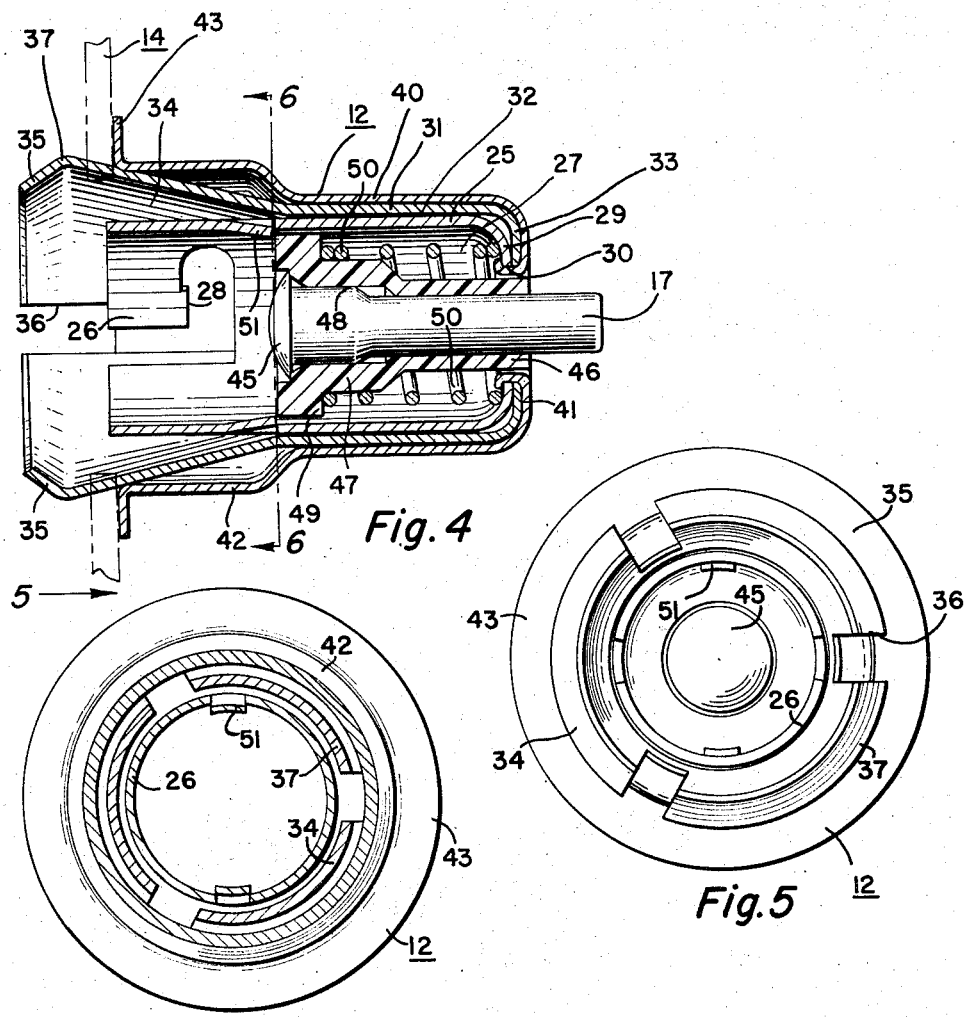
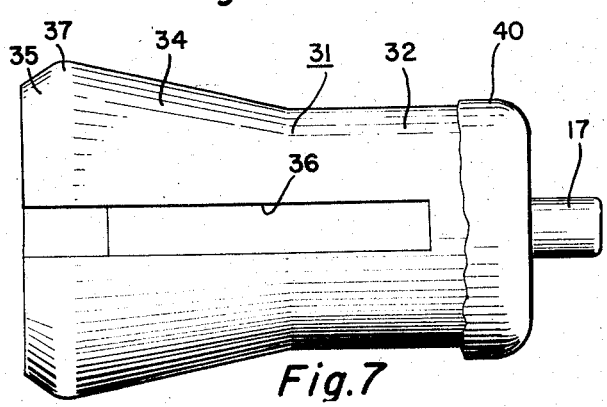
INVENTOR.
Robert C. Woofter
BY
His Attorney INVENTOR.
Robert C. Woofter
BY
Craig V. Morton
His Attorney

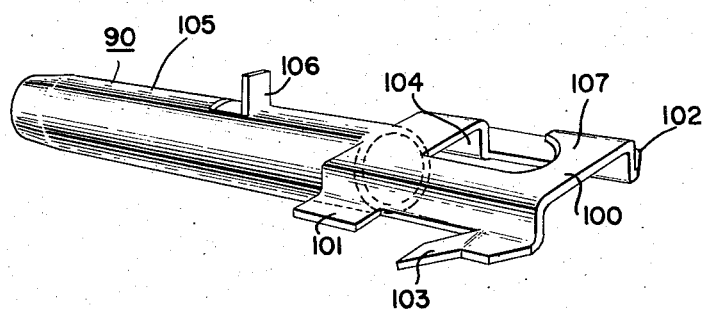
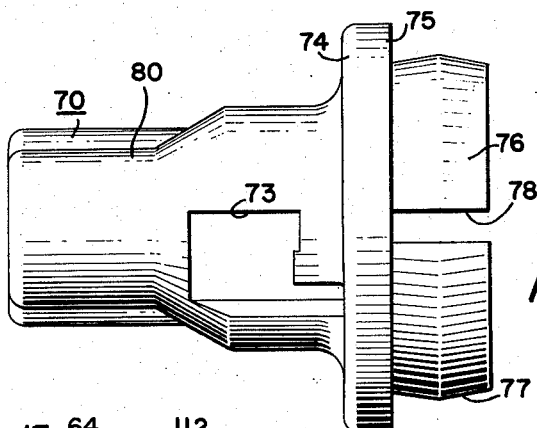
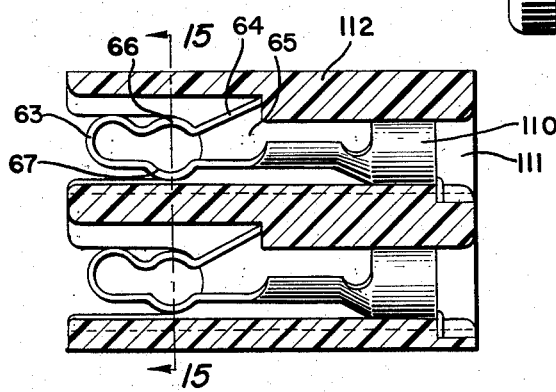
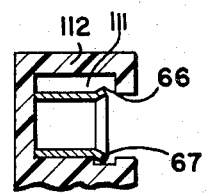

United States Patent Office 2,874,365
Patented Feb. 17, 1959

2,874,365

CONNECTOR

Robert C. Woofter, Cortland, Ohio, assignor to General Motors Corporation, Detroit, Mich., a corporation of Delaware Application September 20, 1954, Serial No. 457,035

4 Claims. (Cl. 339—125)

This invention relates to electrical wiring systems and components thereof particularly adapted for use on the motor vehicles for serving the many electrical components on the vehicle.

The great increase of electrical instruments and other electrical devices on motor vehicles has of recent years greatly increased the complexity of the electrical wiring system, particularly, the electrical wiring system behind the instrument panel of a motor vehicle to serve the several instruments and instrument lighting arrangements. Numerous free wires of considerable length are draped behind the instrument panel in considerable confusion. The long lengths of wire that are loosely draped behind the instrument panel have been required as a result of the necessity of removing certain instruments from the instrument panel, the wire length being needed when the instruments are drawn from behind the instrument panel for repair or replacement. This is particularly true in connection with the lamp bulbs that are used to light up the instrument panel, some of which are used as warning signals to indicate improper operation of the motor vehicle engine.

It is therefore an object of this invention to provide a wiring system arrangement for use behind the instrument panel of a motor vehicle that is arranged to permit manual disconnection of serving wires from instruments served without causing any substantial spatial displacement of the wiring system, and yet permit complete divorcement of the instrument from the instrument panel that it can be removed for repair or replacement.

To provide for a more clean appearance of the wiring behind the instrument panel, avoid confusion between loosely draped wires, and to reduce the cost of wiring systems by eliminating unnecessary wire lengths, it is an object of the invention to arrange the wiring system behind the instrument panel, as in a wiring harness with the harness disposed substantially in a fixed position relative to the instrument panel and provide free wires of very short lengths between the harness and the instruments served to eliminate unnecessary draping of free wire lengths behind the instrument panel. In such an arrangement it is an object of the invention to provide for friction type disconnect connections between the free wire lengths and the instruments so that the wiring system need not be disarranged for any substantial spatial displacement of any of the wires of the system to disconnect the wiring system from the instruments and yet the instruments and the lamp sockets can be spatially displaced from their normal position to an unlimited extent to allow for repair and replacement.

It is a further object of the invention to provide a lamp socket structure that is particularly adapted for use in a wiring system arrangement of the type of the aforementioned objects.

Further objects and advantages of the present invention will be apparent from the following description, reference being had to the accompanying drawings wherein a preferred form of the invention is clearly shown.

In the drawings:

Figure 1 is a perspective elevational view of an instrument panel of the motor vehicle incorporating features of this invention.

Figure 2 is a longitudinal cross sectional view of a lamp socket adapted for use in the wiring system of Fig. 1.

Figure 3 is a cross sectional view taken along line 3—3 of Figure 2 illustrating a friction type disconnect connection for use in the wiring system of Figure 1.

Figure 4 is an enlarged longitudinal cross sectional view of a lamp socket constructed for use in the invention.

Figure 5 is a front elevational view of the lamp socket of Figure 4 taken in the direction of the arrow 5.

Figure 6 is a transverse cross sectional view taken along line 6—6 of Figure 4.

Figure 7 is an elevational view of the lamp socket of Figure 4 with the outer sleeve partially broken away to show the spring finger arrangement for mounting of the socket.

Figure 12 is an elevational view of the the socket of Figure 8.

Figure 13 is a perspective elevational view of one of the terminals used in the socket of Figure 8.

Figure 14 is a longitudinal cross sectional view of a friction type disconnect connection used with the socket of Figure 8.

Figure 15 is a cross sectional view taken along line 15—15 of Figure 14.

Figure 8:
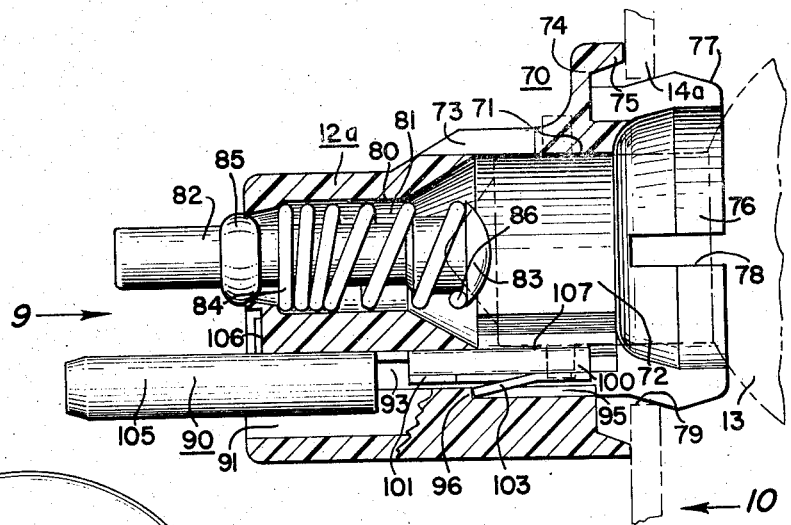
Figure 8 is a longitudinal cross sectional view of a modified arrangement of lamp socket showing a two terminal socket.
Figure 9:
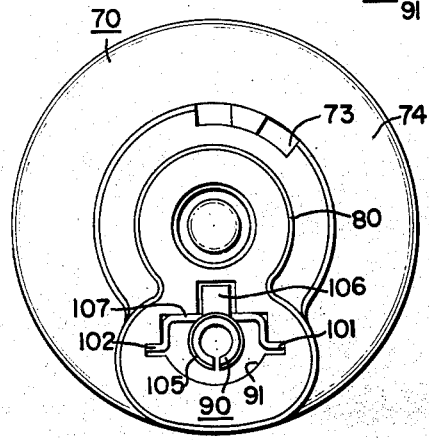
Figure 9 is an end elevational view of the lamp socket of Figure 8 taken in the direction of the arrow 9.

In Figure 1 there is illustrated schematically a wiring system for an instrument panel of the motor vehicle constructed in a manner to incorporate features of this invention. The dash panel 10 of the motor vehicle is provided with instruments of various kind and a lighting cluster arrangement 11. The lighting cluster arrangement includes a plurality of lamp sockets 12 each of which contains a lamp bulb 13. Each of the sockets 12 is frictionally mounted in a panel wall 14 of the cluster arrangement 11 that it may be removed manually merely by overcoming frictional resistance of a resilient retaining spring more fully hereinafter described.

The electric lamp sockets 12 are served by electric conductors 15 that emerge from a wiring harness 20 at suitable intervals along the length of the harness.

Each of the conductors 15 is provided with a connector 16 of a friction type that provides a disconnect connection between the conductor 15 and the lamp socket 12. The friction type connector 16 is adapted to be retained upon the terminal connection 17 projecting from the lamp socket 12 by suitable friction fit that the connector can be removed from the lamp socket terminal 17 manually merely by overcoming the light friction fit that holds the connector on the terminal.

The wiring harness 20 comprises a plurality of conductors that are retained together by a suitable wrapping covering which tends to impart some degree of rigidity to the wiring harness so that it is not completely free for indiscriminate flexing. The main body of the wiring harness 20 may be supported on the instrument panel 10 by suitable brackets 21 of any conventional type to position the harness in a fixed spatial position relative to the panel 10 and relative to the several electrical instrumentalities that are usually supported behind the instrument panel 10.

The conductors 15 that emerge from the wiring harness 20 at suitable locations are free for relatively indiscriminate flexing so that the connector 16 can be removed from the terminal 17 of the socket 12.

However, each of the conductors 15 is of a free length only sufficient to extend between the spatially positioned wiring harness 20 and the instrument served, in this instance the electric lamp sockets 12. This eliminates all extra wiring length that has heretofore been draped behind the instrument panel and led greatly to confusion behind the instrument panel.

However, when the conductors 15 are only of sufficient length to extend between the spatially positioned wiring harness 20 and the instruments served, there is no free length of conductor provided by which the instrument can be removed from behind the instrument panel for unlimited spatial displacement from the panel that the instrument can be repaired, or in this instance, the lamp bulb be replaced in the socket 12 in the case of a burn out of the lamp bulb.

In this invention however the friction type disconnect connection provided between the conductor 15 and the terminal 17 of the socket 12 allows for disconnection of the connector 16 from the terminal 17 without causing any spatial displacement of the wiring harness 20. The lamp socket 12 can then be removed from its friction engagement with the panel wall 14 and have unlimited spatial displacement from the instrument panel 10 for removal and replacement of the lamp bulb 13 from the socket 12.

Upon replacement of the lamp socket 12 into the panel wall 14, the connector 16 will be substantially in the same position that it normally retains so that the operator will have no difficulty in locating the connector and returning it to its proper position on the terminal 17 for the lamp socket 12.

In Figures 2 and 4 there is illustrated a single terminal lamp socket 12 that is particularly adapted for use in the wiring system arrangement illustrated in Figure 1.

The lamp socket comprises a cylindrical metal sleeve 25 that has an end chamber portion 26 adapted to receive the base of a lamp bulb and a coaxially extending chamber portion 27 that receives a terminal contact. The chamber end 26 has the walls thereof provided with J slots 28 disposed in the chamber wall 180° opposite one another to receive the radially extending prongs of the base of a bayonet type light bulb. The end wall 29 of the chamber portion 27 has a reduced diameter opening 30 through which the terminal contact 17 extends.

A second substantially cylindrical metal sleeve 31 is positioned around the sleeve 25 and has a cylindrical end portion 32 substantially conforming with the chamber end portion 27 of the sleeve 25 with the end wall 33 thereof terminating at the same reduced diameter opening as the opening 30 of the sleeve 25. The forward portion 34 of the sleeve 31 is disposed radially angularly outwardly to the sleeve 25 and forms a plurality of spring fingers 35, the longitudinally extending slots 36 separating the fingers 35 one from the other. Each of the spring fingers 35 has a raised portion 37 that is adapted to be positioned on one side of a panel wall 14, illustrated in dot-dash lines.

A third metal sleeve 40 is positioned around the sleeve 31 and has the end wall 41 thereof reversely bent through the reduced diameter openings in the sleeves 25 and 32, as shown in Figure 4, to retain the three sleeves in assembled relationship. The sleeve 40 has the forward portion 42 thereof provided with an outwardly radially extending flange 43 that is adapted to be placed on the other side of the panel wall 14.

When the socket 12 is inserted into the panel wall 14, as shown in Figure 1, the spring fingers 35 engage the opening in the panel wall provided for the socket and retains the flange 43 of the socket against the panel wall 14, the raised portion 37 of the spring fingers 35 snapping over the opposite side of the panel wall to retain the socket therein.

The socket 12 is provided with a contact terminal pin 17 that has a headed end 45 that provides a contact terminal for the central contact of a single contact lamp bulb of conventional type. The terminal pin 17 is fitted within an electrical insualting sleeve 46 with the enlarged portion 47 being frictionally retained in the bore 48 of the sleeve 46. The sleeve 46 has a radially flanged enlarged head end 49 that is engaged by one end of a compression spring 50, the opposite end of the compression spring being positioned on the wall 29 of the sleeve 25. The spring 50 urges the sleeve 46 toward the chamber portion 26 of the sleeve 25, stop means 51 being provided in the wall of the sleeve 25 to prevent the sleeve 46 from discharging through the chamber end 26. Also the tang stops 51 have sufficient radial resilience to permit insertion of the sleeve into the chamber portion 27 from the chamber portion 26.

The electrical insulating sleeve 46 projects through the reduced diameter opening in the end walls of the assembled sleeves, as shown in Figure 4 to prevent contact of the metal pin 17 with the sleeves and thus eliminate electrical short circuiting.

In the socket 12 of Figure 4, the metal sleeves form one terminal of the electric circuit and the contact pin 17 provides the other terminal for the lamp bulb contained in the socket, the sleeve structure of the socket 12 being conventionally the ground side of the circuit.

In Figure 3 there is illustrated a friction type disconnect connection adapted to be placed upon the terminal pin 17 of the socket 12 for connecting a conductor 15 on the terminal pin 17.

The disconnect connector 16 comprises an electrical insulating body 60 having a through passage 61 that receives a hairpin type terminal 62. The bight 63 of the hairpin terminal 62 forms a spring connection between opposite legs 64 and 65 of the terminal. The legs of the terminal are provided with circularly enlarged portions 66 and 67 respectively that frictionally engage the periphery of the terminal pin 17 and thereby retain the connector 16 in position on the terminal pin, as illustrated in Figure 2.

A slot 68 is provided in one wall of the body 60 of the connector 16 and a slot 69 is provided in the bottom wall thereof whereby the terminal pin 17 can be guided into position in engagement with the terminal 62.

In Figures 8–12 there is illustrated a modified arrangement of a lamp socket that is adapted for use in the lighting system arrangement illustrated in Figure 1, this being a two terminal lamp socket in which both the serving wire and the ground wire are connected to lamp socket terminals as distinguished from the ground connection provided by the body of the lamp socket itself as shown in Figure 4.

In this arrangement the lamp socket 12a comprises a body 70 made of electrical insulating material. The body 70 has an axially extending recess 71 forming a chamber 72 adapted to receive the base of a lamp bulb 13, illustrated in dot-dash lines.

The radial wall of the recess 71 is provided with a radially extending slot 73, in the form of a J slot, adapted to receive a radially extending prong of a lamp bulb base of the bayonet type, this being a conventional type of connection.

The body 70 is provided with a radially extending wall 74 on the forward end thereof that forms a shoulder 75 adapted to seat against one side of a wall panel 14a, illustrated in dot-dash lines. The body 70 is also provided with forwardly extending finger portions 76 that are integral with the body. The outer periphery of the finger portions 76 has a radially extending cam surface 77 that has the peak thereof of larger diameter than the internal diameter of the opening adapted to receive the fingers 76. Longitudinally extending slots 78 between the fingers 76 provide the fingers with sufficient resilience that the fingers can be inserted through the opening 79 of the panel 14a to place the shoulder 75 against the panel and retain the lamp socket body 70 frictionally within the opening in the panel 14a.

The body 70 is provided with a reduced diameter bore 80 coaxially extending from the chamber 72 to provide a chamber 81 that receives a terminal contact pin 82.

The terminal contact pin 82 has the headed end 83 that forms a contact engageable by the central contact on a lamp bulb base disposed within the chamber 72. A compression spring 84 encircles the pin 82 and is retained thereon by a boss 85 on the pin. The pin 82 is retained within the chamber 81 by means of a boss 85 that is forced through the open end of the chamber 81 that is slightly smaller in diameter than the diameter of the boss 85. The end of the spring 84 thus seats on the end wall of the chamber 81. The end 86 of the spring 84 engages the headed end 83 to provide for reciprocal resilience of the contact pin to maintain the head 83 in engagement with the base contact of a lamp bulb.

A second terminal connection 90 is disposed in the body 70 in a through passage 91 that is disposed parallel with the passage formed by the chambers 72 and 81. The through passage 91 has grooves 93 and 94 in opposite walls thereof, one of which grooves has a ledge 95 to form a shoulder 96.

The terminal 90 positioned in the through passage 91 is more specifically illustrated in Figure 13. This terminal comprises a channel shaped portion 100 that has the radially extending flange portions 101 and 102 extending from opposite sides thereof, and in parallel planar relationship. One of the flange portions 101 has a tang 103 formed downwardly therefrom. The flat face of the channel portion 100 has a slot 104, in the form of a J slot that is adapted to be positioned diametrically opposite the J slot 73 in the body of the socket 12a to receive the second projecting prong from a bayonet type lamp socket base.

The terminal 90 includes a cylindrical pin portion 105 that extends parallel with the channel portion 100 and is provided with an upwardly extending tang 106.

Figure 10:
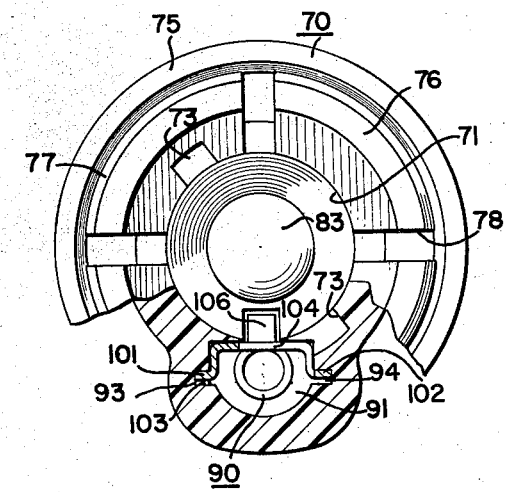
Figure 10 is an end elevational view of the socket of Figure 8 taken in the direction of the arrow 10, with a portion thereof broken away to illustrate one of the terminal connection mountings.
Figure 11:
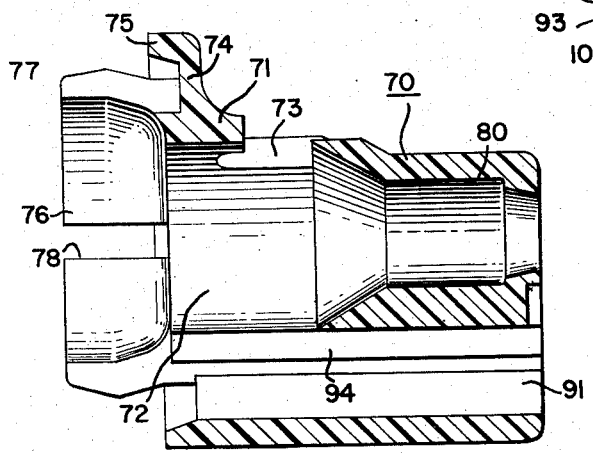
Figure 11 is a transverse cross sectional view of the lamp socket body shown in Figure 8 but taken 180° therefrom.

As shown in Figures 8 and 10, the upper face 107 of the channel shaped portion 100 is tangent to the peripheral wall of the chamber 72 and provides electrical contact engagement with the periphery of the base portion of a bayonet type lamp bulb inserted into the chamber 72.

The terminal pin 105 projects from the body 70 parallel with the terminal pin 82. The tangs 106 and 103 on the terminal 90 retain the terminal in position in the lamp socket body 70.

As will be seen in Figure 10, there is a slight amount of clearance provided between the grooves 93 and 94 that receive the flanges 101 and 102 of the terminal 90. The tang 103 can thus act as a spring with the terminal 90 pivoting about the flange 102 in the slot 94 for resilient engagement of the terminal 90 with the periphery of a lamp base positioned in the chamber 72.

In Figures 14 and 15 there is illustrated in somewhat larger detail, a friction type disconnect connection adapted for use with the two terminal lamp socket illustrated in Figure 8. The terminals 110 placed therein are of the same structure as the terminal illustrated in Figure 3, hence like reference numerals are applied to these terminals. The through passages 111 in the connector body 112 are spaced so as to position the circular portions 66 and 67 of the terminals 110 on the axes of the terminal pins 82 and 90. Thus the terminal pins 82 and 90 can be inserted into the terminals 110 in a direction at right angles to the terminals 110 as illustrated in Figure 14.

While the form of embodiment of the invention as herein disclosed constitutes a preferred form, it is to be understood that other forms might be adopted as may come within the scope of the claims which follow.

What is claimed is as follows:

1. A combination electrical wiring system arrangement for use in limited space behind an instrument panel of a motor vehicle, comprising, a panel having openings therein, a plurality of lamp sockets each removably mounted in respective panel openings, a plurality of electrical conductors bound together forming an electrical wiring harness with each of the respective conductors emerging from the harness at different points along the length thereof, means retaining said harness in fixed spatial position relative to said panel and to said lamp sockets, each of said conductors having a free length sufficient only for a direct line connection between said harness and a respective one of said lamps, a plurality of terminal connectors with legs bent to form a hairpin loop, said connectors each being attached to a free end of each free length of said conductors, an electrical insulating member housing each of said hairpin connectors to be cooperable with a guide slot formed with said member, and at least one lamp-engaging terminal means projecting outwardly from each of said sockets, said terminal means being engageable through the guide slot of said insulating member with a respective hairpin connector by feel in installation due to clean and orderly arrangement of said wiring system upon mounting of each lamp socket free of wiring in respective openings easily reconnectible behind said panel due to fixed spatial relation of said connectors and each insulating member with said harness relative to each lamp socket, each lamp socket including, a body of electrical insulating material having a cylindrical chamber portion to receive the base of a lamp bulb and a coaxially extending chamber portion contiguous with the first portion, a terminal contact member comprising a pin resiliently reciprocably positioned in said second mentioned chamber having a headed end positioned adjacent to and coaxial with said first mentioned chamber for engagement by a central contact on a lamp bulb disposed therein and having the opposite end projecting out of said body coaxial with said second mentioned chamber, spring means disposed in said second mentioned chamber and frictionally retained therein and encircling said terminal resiliently urging the same toward the first mentioned chamber, a through passage in said body adjacent said first and second chambers and parallel thereto, a terminal member positioned in said through passage having a portion thereof tangent to the periphery of the first mentioned chamber for electrical contact engagement with the base of the lamp bulb disposed therein and having a pin portion projecting from said body parallel with said first mentioned contact member.

2. A combination electrical wiring system arrangement for use in limited space behind an instrument panel of a motor vehicle, comprising, a panel having openings therein, a plurality of lamp sockets each removably mounted in respective panel openings, a plurality of electrical conductors bound together forming an electrical wiring harness with each of the respective conductors emerging from the harness at different points along the length thereof, means retaining said harness in fixed spatial position relative to said panel and to said lamp sockets, each of said conductors having a free length sufficient only for a direct line connection between said harness and a respective one of said lamps, a plurality of terminal connectors with legs bent to form a hairpin loop, said connectors each being attached to a free end of each free length of said conductors, an electrical insulating member housing each of said hairpin connectors to be cooperable with a guide slot formed with said member, and at least one lamp-engaging terminal means projecting outwardly from each of said sockets, said terminal means being engageable through the guide slot of said insulating member with a respective hairpin connector by feel in installation due to clean and orderly arrangement of said wiring system upon mounting of each lamp socket free of wiring in respective openings easily reconnectible behind said panel due to fixed spatial relation of said connectors and each insulating member with said harness relative each lamp socket, each lamp socket including, a body of electrical insulating material having a cylindrical chamber portion to receive the base of a lamp bulb and a coaxially extending chamber portion contiguous with the first portion, a terminal contact member comprising a pin resiliently reciprocably positioned in said second mentioned chamber having a headed end positioned adjacent to and coaxial with said first mentioned chamber for engagement by a central contact on a lamp bulb disposed therein and having the opposite end projecting out of said body coaxial with said second mentioned chamber, spring means disposed in said second mentioned chamber and frictionally retained therein and encircling said terminal resiliently urging the same toward the first mentioned chamber, a through passage in said body adjacent said first and second chambers and parallel thereto, a terminal member positioned in said through passage having a portion thereof tangent to the periphery of the first mentioned chamber for electrical contact engagement with the base of the lamp bulb disposed therein and having a pin portion projecting from said body parallel with said first mentioned contact member, said through passage being provided with parallel grooves in opposite walls thereof, one of said grooves having a recess providing a shoulder, said second terminal member having the first portion thereof shaped substantially in the form of a channel with outwardly flanged edges, the said terminal portion being disposed in said through passage with the flanged edges in said grooves to position the flat face of the channel portion tangent to the periphery of the first mentioned chamber, one of said flanged edges having a tang engaging said shoulder, said pin portion of said second portion having a tang engaging said body, said tangs retaining said second terminal in said through passage.

3. A combination electrical wiring system arrangement for use in limited space behind an instrument panel of a motor vehicle, comprising, a panel having openings therein, a plurality of lamp sockets each removably mounted in respective panel openings, a plurality of electrical conductors bound together forming an electrical wiring harness with each of the respective conductors emerging from the harness at different points along the length thereof, means retaining said harness in fixed spatial position relative to said panel and to said lamp sockets, each of said conductors having a free length sufficient only for a direct line connection between said harness and a respective one of said lamps, a plurality of terminal connectors with legs bent to form a hairpin loop, said connectors each being attached to a free end of each free length of said conductors, an electrical insulating member housing each of said hairpin connectors to be cooperable with a guide slot formed with said member, and at least one lamp-engaging terminal means projecting outwardly from each of said sockets, said terminal means being engageable through the guide slot of said insulating member with a respective hairpin connector by feel in installation due to clean and orderly arrangement of said wiring system upon mounting of each lamp socket free of wiring in respective openings easily reconnectible behind said panel due to fixed spatial relation of said connectors and each insulating member with said harness relative each lamp socket, each lamp socket including, a body of electrical insulating material having a cylindrical chamber portion to receive the base of a lamp bulb and a coaxially extending chamber portion contiguous with the first portion, a terminal contact member comprising a pin resiliently reciprocably positioned in said second mentioned chamber having a headed end positioned adjacent to and coaxial with said first mentioned chamber for engagement by a central contact on a lamp bulb disposed therein and having the opposite end projecting out of said body coaxial with said second mentioned chamber, spring means disposed in said second mentioned chamber and frictionally retained therein and encircling said terminal resiliently urging the same toward the first mentioned chamber, a through passage in said body adjacent said first and second chambers and parallel thereto, a terminal member positioned in said through passage having a portion thereof tangent to the periphery of the first mentioned chamber for electrical contact engagement with the base of the lamp bulb disposed therein and having a pin portion projecting from said body parallel with said first mentioned contact member, said through passage being provided with parallel grooves in opposite walls thereof, one of said grooves having a recess providing a shoulder, said second terminal member having the first portion thereof shaped substantially in the form of a channel with outwardly flanged edges, the said terminal portion being disposed in said through passage with the flanged edges in said grooves to position the flat face of the channel portion tangent to the periphery of the first mentioned chamber, one of said flanged edges having a tang engaging said shoulder, said pin portion of said second terminal having a tang engaging said body, said tangs retaining said second terminal in said through passage, said tang in said flanged edge providing resilient means to effect resilient engagement of the flat face of the channel portion with the base of a lamp bulb positioned in the socket.

4. A combination electrical wiring system arrangement for use in limited space behind an instrument panel of a motor vehicle, comprising, a panel having openings therein, a plurality of lamp sockets each removably mounted in respective panel openings, a plurality of electrical conductors bound together forming an electrical wiring harness with each of the respective conductors emerging from the harness at different points along the length thereof, means retaining said harness in fixed spatial position relative to said panel and to said lamp sockets, each of said conductors having a free length sufficient only for a direct line connection between said harness and a respective one of said lamps, a plurality of terminal connectors with legs bent to form a hairpin loop, said connectors each being attached to a free end of each free length of said conductors, an electrical insulating member housing each of said hairpin connectors to be cooperable with a guide slot formed with said member, and at least one lamp-engaging terminal means projecting outwardly from each of said sockets, said terminal means being engageable through the guide slot of said insulating member with a respective hairpin connector by feel in installation due to clean and orderly arrangement of said wiring system upon mounting of each lamp socket free of wiring in respective openings easily reconnectible behind said panel due to fixed spatial relation of said connectors and each insulating member with said harness relative each lamp socket, each lamp socket including, a body of electrical insulating material having a cylindrical chamber portion to receive the base of a lamp bulb and a coaxially extending chamber portion contiguous with the first portion, a terminal contact member comprising a pin resiliently reciprocably positioned in said second mentioned chamber having a headed end positioned adjacent to and coaxial with said first mentioned chamber for engagement by a central contact on a lamp bulb disposed therein and having the opposite end projecting out of said body coaxial with said second mentioned chamber, spring means disposed in said second mentioned chamber and connected with and encircling said terminal means resiliently urging said terminal means toward said first mentioned chamber to retract partially the end of said pin projecting out of said body back into said second mentioned chamber when the lamp bulb base is missing from said first mentioned chamber, the lamp bulb base when inserted in said first mentioned chamber effecting extended projection of said pin end out of said body engageable with said connectors from said harness, said body being of an electrical insulating material with the spring and terminal contact pin supported directly by the body, a second terminal contact disposed in said body parallel with said pin, a part of said second contact located tangent to said first mentioned chamber for electrical engagement with a periphery of the lamp bulb base disposed in said first mentioned chamber, and a pin portion with said second terminal contact, said pin portion extending exteriorly of said body at the same end as said resiliently reciprocal contact pin, said hairpin connectors being provided in duplicate in each said insulating member engageable through the guide slots thereof with said second terminal contact pin portion and said contact pin respectively.

References Cited in the file of this patent

UNITED STATES PATENTS

| | | |
|---|---|---|
| 1,634,405 | Douglas | July 5, 1927 |
| 2,166,420 | Robertson | July 18, 1939 |
| 2,248,399 | Watts | July 8, 1941 |
| 2,299,140 | Hanson | Oct. 20, 1942 |
| 2,668,888 | Johnson | Feb. 9, 1954 |
| 2,677,045 | MacArthur | Apr. 27, 1954 |
| 2,728,060 | Doeg | Dec. 20, 1955 |
| 2,741,747 | Woofter | Apr. 10, 1956 |

FOREIGN PATENTS

| | | |
|---|---|---|
| 329,371 | Great Britain | May 16, 1930 |